US010042929B2

(12) United States Patent
Orozco et al.

(10) Patent No.: US 10,042,929 B2
(45) Date of Patent: *Aug. 7, 2018

(54) MODIFICATION OF SEARCH SUBJECT IN PREDICTIVE SEARCH SENTENCES

(71) Applicant: International Business Machines Corporation, Armonk, NY (US)

(72) Inventors: Liliana Orozco, Del Valle, TX (US); Christopher A. Peters, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 342 days.

This patent is subject to a terminal disclaimer.

(21) Appl. No.: 14/734,083

(22) Filed: Jun. 9, 2015

(65) Prior Publication Data

US 2016/0364483 A1 Dec. 15, 2016

(51) Int. Cl.
*G06F 17/30* (2006.01)
*G10L 15/26* (2006.01)

(52) U.S. Cl.
CPC .... *G06F 17/30864* (2013.01); *G06F 17/3097* (2013.01); *G06F 17/30657* (2013.01); *G10L 15/265* (2013.01)

(58) Field of Classification Search
CPC ........ G06F 17/30864; G06F 17/30657; G06F 17/3097; G10L 15/265
See application file for complete search history.

(56) References Cited

U.S. PATENT DOCUMENTS

| 2004/0102971 | A1 | 5/2004 | Lipscher et al. |
| 2006/0074630 | A1 | 4/2006 | Chelba et al. |
| 2006/0206330 | A1 | 9/2006 | Attwater et al. |
| 2007/0083357 | A1 | 4/2007 | Moore et al. |
| 2008/0243777 | A1* | 10/2008 | Stewart ............. G06F 17/30684 |
| 2010/0324896 | A1 | 12/2010 | Attwater et al. |
| 2012/0095999 | A1 | 4/2012 | Donde et al. |

(Continued)

FOREIGN PATENT DOCUMENTS

EP 2375714 A1 10/2011

OTHER PUBLICATIONS

IBM: List of IBM Patents or Patent Applications Treated as Related (Appendix P), Jun. 17, 2015, pp. 1-2.

(Continued)

*Primary Examiner* — Alexander Khong
(74) *Attorney, Agent, or Firm* — Samuel A. Waldbaum (57) ABSTRACT

A method for modification of search subjects in a set of predictive search terms in which a set of search terms from a user is received and communicated to a search engine. One or more sets of predictive search terms from the search engine based on the set of search terms is received from the search engine and one or more search subjects within the one or more sets of predictive search terms is identified. A plurality of set of predictive search terms, where the one or more search subjects are displayed differently from other displayed terms is displayed and the user is presented with an option to modify the one or more search subjects. A modified search subject is received and a modified search sentence comprising the set of search terms, and one or more of the predictive search terms and the modified search subject is displayed.

17 Claims, 6 Drawing Sheets

(56) References Cited

U.S. PATENT DOCUMENTS

2013/0041878 A1* 2/2013 Satyanarayana .... G06F 17/3097
                                                                707/706
2014/0229158 A1   8/2014 Zweig et al.
2015/0186551 A1* 7/2015 Badimon .......... G06F 17/30976
                                                                707/722

OTHER PUBLICATIONS

Pending U.S. Appl. No. 14/741,564, filed Jun. 17, 2015 entitled: "Modification of Search Subject in Predictive Search Sentences", pp. 1-32.
Mukadah, "Mobile Interface Design with Predictive Algorithm for Improved Text Entry", Rhodes University, Submitted in Partial Fulfilment of an Honours Degree in Computer Science, Nov. 5, 2007, pp. 1-85.
He et al., "Constructive model predictive control for constrained nonlinear systems", Optimal Control Applications and methods, Feb. 20, 2008, vol. 29, pp. 467-481.

* cited by examiner

MODIFICATION OF SEARCH SUBJECT IN PREDICTIVE SEARCH SENTENCES

BACKGROUND

The present invention relates generally to the field of computer systems, and more particularly to semantic analysis and predictive online searching.

Functional efficiency is an important part of any online search engine. Functionality of a particular search engine may vary by several factors including the efficiency of predictive search terms.

Through the use of a user interface, such as a user interface of a web browser, a user can access web pages that contain information. One technique for finding specific web pages on the Internet or an intranet is through the use of a search engine. Search engines typically maintain an index of millions or billions of web pages and provide a web browser interface that can be used to search and access web pages by keywords and text phrases in the web pages. Some well-known search engines include Google™ and Yahoo!®.

Autocomplete, or presenting a set of predictive search terms, is a feature in which a search engine predicts the rest of a word a user is typing in a search input field. In graphical user interfaces, users can typically accept one of several predictive search terms. This feature speeds up human-computer interactions.

SUMMARY

It may be desirable to implement a method, system, and computer program product which considers various aspects of use of a particular search phrase in order to give users an option to customize predictive search terms.

An embodiment of the present disclosure provides a method for modification of search subjects in a set of predictive search terms. The method receives terms to be searched from a user, and communicates the search terms to a search engine. The method receives predictive search terms from the search engine (based on the search terms). The method identifies a search subject within the provided predictive search terms. The method displays a user interface which indicates the search subject to the user. The method presents the user with an option to modify the search subject. The method receives a modified search subject. The method displays a modified search sentence based on user's modifications. The method may also include communicating the modified search sentence to a search engine. The method may include replacing at least one of the search subjects with a blank space. The method may include receiving a text input from the user and determining the modified search subject based on the received text input. The method may include communicating the modified search sentence to a search engine. The method may include setting an input cursor at a beginning location of the blank space. The method may include generating a prompt for the user to speak, receiving an audio input from the user, and converting the audio input into digital text.

According to a further embodiment, a computer system modification of search subjects in a set of predictive search terms. The computer system receives terms to be searched from a user, and communicates the search terms to a search engine. The computer system receives predictive search terms from the search engine (based on the search terms). The computer system identifies a search subject within the provided predictive search terms. The computer system displays a user interface which indicates the search subject to the user. The computer system presents the user with an option to modify the search subject search term. The computer system receives a modified search subject. The computer system displays a modified search sentence based on user's modifications.

According to another embodiment, a computer program product for modification of search subjects in a set of predictive search terms. The computer program product receives terms to be searched from a user, communicating the search terms to a search engine. The computer program product receives predictive search terms from the search engine (based on the search terms). The computer program product identifies a search subject within the provided predictive search terms. The computer program product displays a user interface which indicates the search subject to the user. The computer program product presents the user with an option to modify the search subject search term. The computer program product receives a modified search subject. The computer program product displays a modified search sentence based on user's modifications.

DETAILED DESCRIPTION

While the present invention is particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1A:
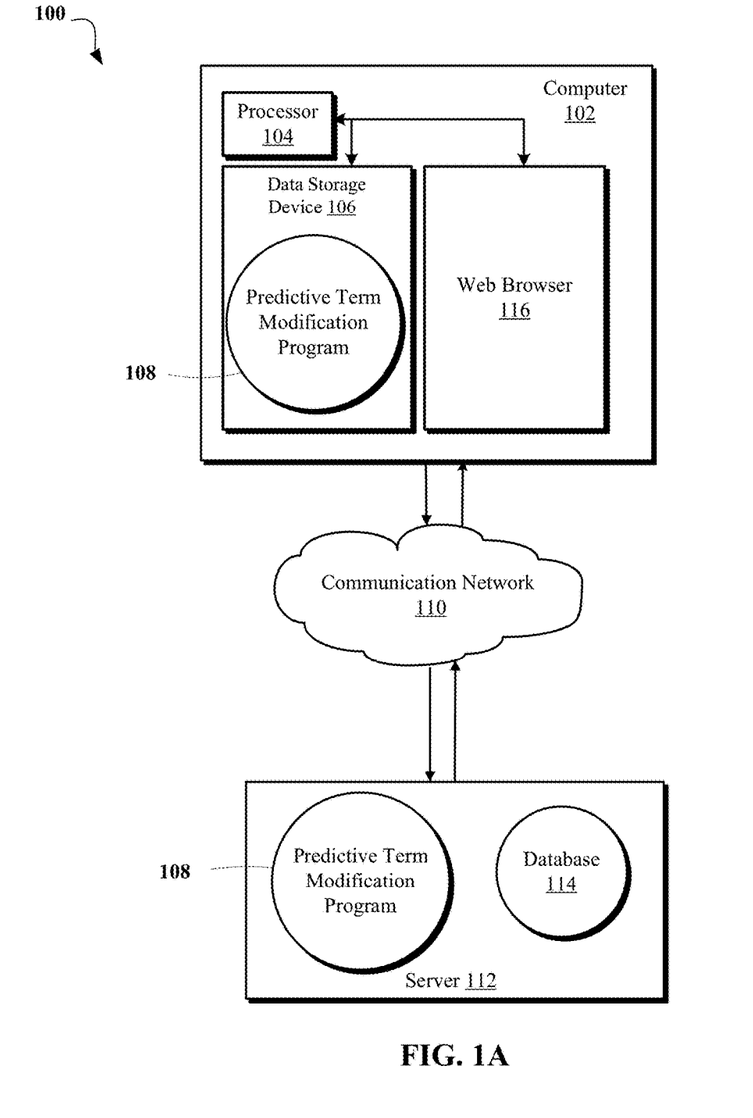
FIGS. 1A-B are schematic block diagrams depicting an exemplary computing environment for a Predictive Term Modification Program, according to an aspect of the present disclosure.

FIG. 1A is a schematic block diagram depicting a computing environment 100 for a Predictive Term Modification Program. In various embodiments of the present invention, computing environment 100 includes a computer 102 and server 112, connected over communication network 110.

Computer 102 may include a processor 104 and a data storage device 106 that is enabled to run a Predictive Term Modification Program and a web browser 116, in order to display the result of a program on server 112, such as, Predictive Term Modification Program 108 communicated by communication network 110.

Computing environment 100 may also include a server 112 with a database 114. The server 112 may be enabled to run a Predictive Term Modification Program 108. Communication network 110 may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. communication network 110 may also include a number of different types of networks, such as, for example, an intranet, a local area network (LAN), or a wide area network (WAN).

It should be appreciated that FIG. 1A provides only an illustration of one implementation and does not imply any limitations with regard to the environments in which different embodiments may be implemented. Many modifications to the depicted environments may be made based on design and implementation requirements.

The computer 102 may communicate with server 112 via the communication network 110. The communication network 110 may include connections, such as wire, wireless communication links, or fiber optic cables.

Computer 102 and server 112 may be, for example, a mobile device, a telephone, a personal digital assistant, a netbook, a laptop computer, a tablet computer, a desktop computer, or any type of computing device capable of running a program and accessing a network. A program, such as a Predictive Term Modification Program 108 may run on the client computer 102 or on the server 112. It should be appreciated that managing program 108 has the same component and operation methods regardless of whether it is run on the server 112 or computer 102. Therefore Predictive Term Modification Program 108 applies to a program implemented within the environment of the computer 102 and/or implemented within the environment of the server 112 interchangeably.

Figure 1B:
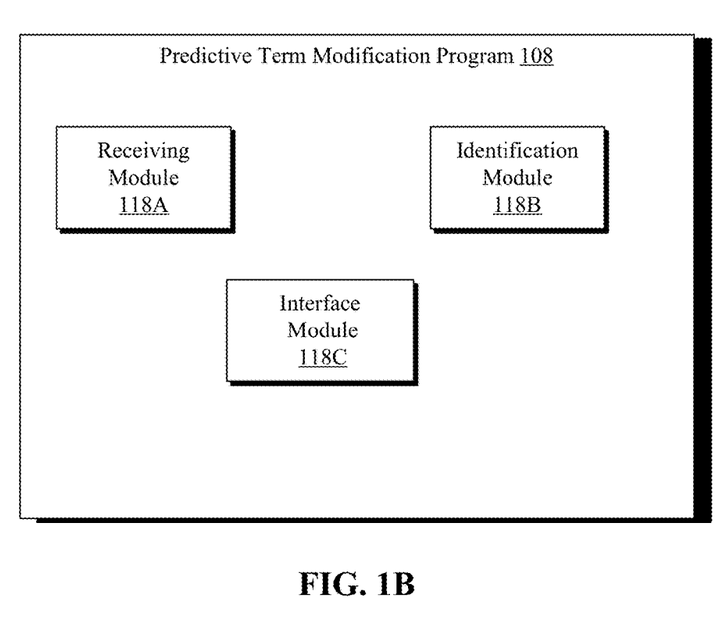

Referring now to FIG. 1B, the components of the Predictive Term Modification Program 108, are illustrated. Predictive Term Modification Program 108 comprises 3 modules: receiving module 118A, identification module 118B, and interface module 118C. Receiving module 118A may receive terms to be searched from a user, communicate the search terms to a search engine, and receive predictive search terms from the search engine (based on the search terms). Identification module 118B may identify a search subject within the predictive search terms. Interface module 118C may display a user interface which indicates the search subject to the user, present the user with an option to modify the search subject search term, receive a modified search subject, and display a modified search sentence based on the user's modifications.

For example, in an embodiment, a set of words such as "what are the" is received by the receiving module 118A. Receiving module 118A may communicate these search terms to a search engine online displayed on web browser 116 on a computer 102. Receiving module 118A may also receive the predictive search terms such as: "What are the books written by John Grisham", "What are the books written by Steinbeck", "What are the books written by Shakespeare", "What are the albums of the Beatles", and "What are the albums of Justin Bieber" from the search engine server. Identification module 118B may analyze these predictive search terms and identify the last word as the search subject. Furthermore, interface module 118C may display: "What are the books written by ________"; receive the word "Hemingway" from the user, display the modified new search sentence ("what are the books written by Hemingway"), and communicate the new modified search sentence to the online search engine.

Figure 2:
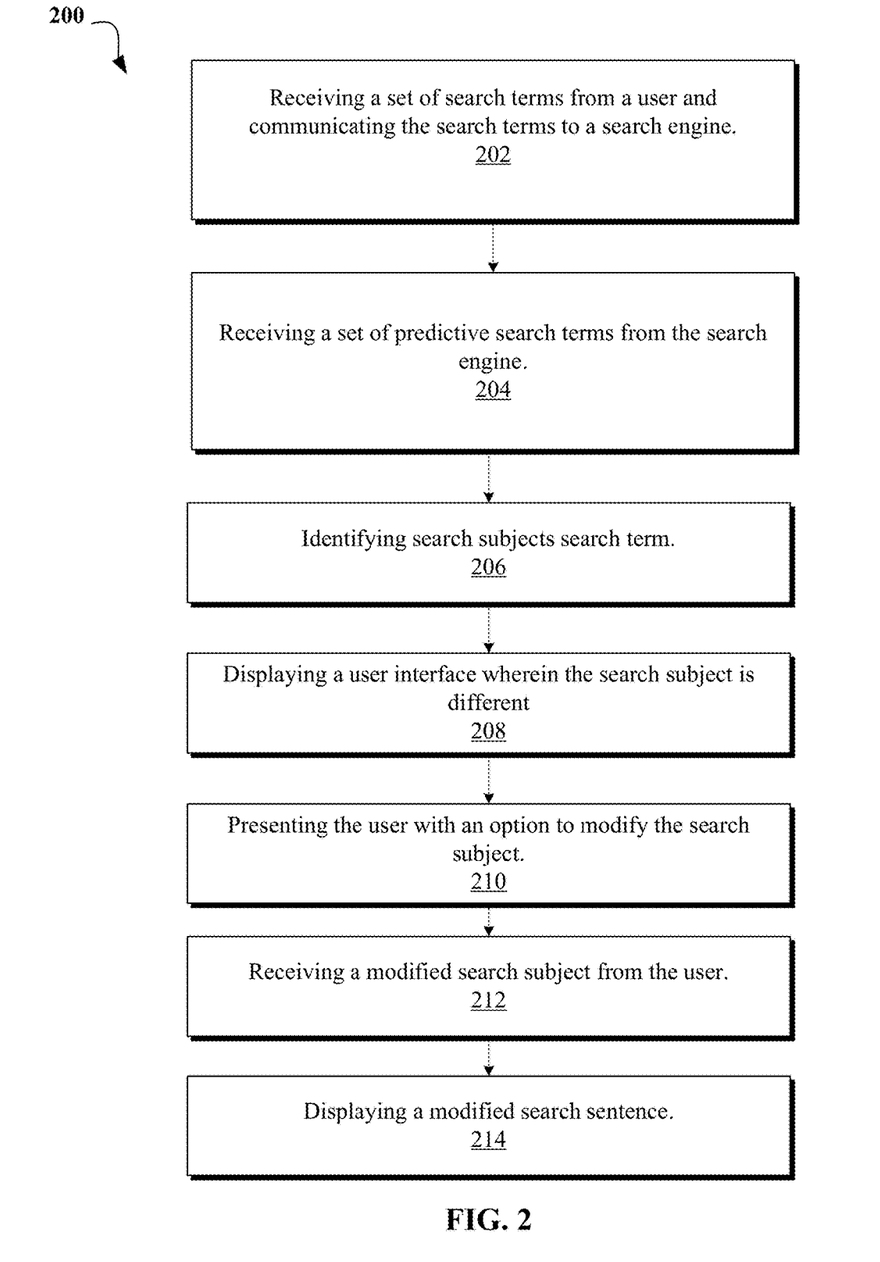
FIG. 2 is a flowchart depicting operational steps of a method for a Predictive Term Modification Program, in accordance with an embodiment of the present disclosure.
Figure 3:
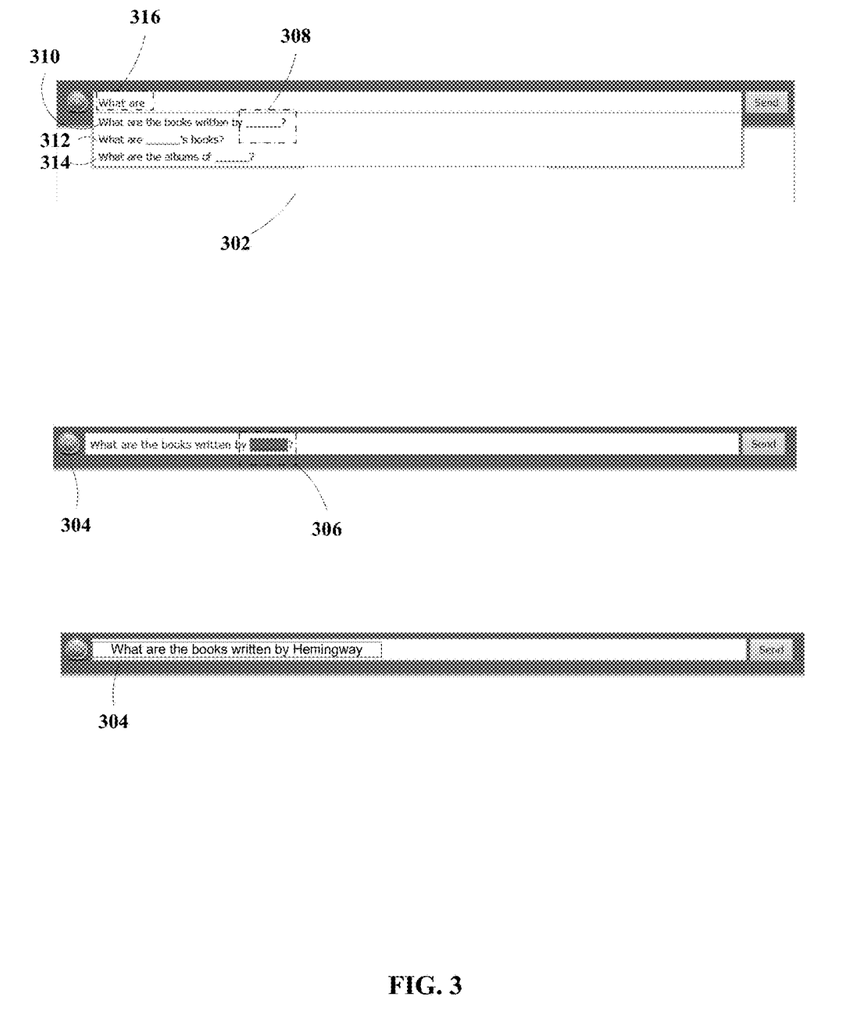
FIG. 3 is a schematic block diagram depicting display of a user interface to modify the search subject, in accordance with an embodiment of the present disclosure.

FIG. 2 is flowchart, which in conjunction with FIG. 3, depicts the operational steps of a method 200 for a Predictive Term Modification Program 108, in accordance with an embodiment of the present disclosure. According to the present disclosure, the method 200 includes modification of a search sentence: "what are the books written by Hemingway".

In reference to FIGS. 1A, 1B, 2 and 3, steps of the method 200 may be implemented using one or more modules of a computer program, for example, the Predictive Term Modification Program 108, and executed by a processor of a computer such as the computer 102.

At 202 and 204 operation of the receiving module 118A is depicted. Referring now to block 202, the receiving module 118A may receive a set of words from a user or an electronic input source for use in a search, using an online search engine. Receiving module 118A may receive the word(s) from a user or a computer implemented system. Non-limiting examples of an input source may be spoken words, typed words, or inputting a corpus electronically from a computer implemented source such as an electronic device (e.g. cell phones, tablets, or other electronic devices with speech recognition programs). Receiving module 118A may also communicate the words received to a search engine. Furthermore, receiving module 118A may receive a set of predictive search terms from the search engine.

In the present embodiment, receiving module 118A receives words for searching from a user. The user may type in the words on a computer keyboard (i.e. electronic input source). In the present embodiment, receiving module receives the word "what are the" from the user along with instructions to search those words with a google search engine (FIG. 3, sentence 316). It must be noted that the user typing words on a search bar may be treated as instructions to search for the words with an online searching tool.

It must also be appreciated that for the purposes of this invention, a search sentence includes the grammatical meaning of a sentence (i.e. a sentence is a linguistic unit consisting of one or more words that are grammatically linked. A sentence can include words grouped meaningfully to express a statement, question, exclamation, request, command or suggestion) or a sentence fragment or an incomplete sentence (i.e. an incomplete sentence, or sentence fragment, is a set of words which does not form a complete sentence, either because it does not express a complete thought or because it lacks some grammatical element, such as a subject or a verb).

Receiving module 118A, in the present embodiment, communicates the received words to the google search engine server. In the present embodiment, receiving module 118A also receives a set of predictive search terms from the google search engine server. In this embodiment the predictive search terms are as follows:

"What are the books written by John Grisham";
"What are the books written by Steinbeck";
"What are the books written by Shakespeare";
"What are the albums of the Beatles"; and
"What are the albums of Justin Bieber".

At 206, operations of the identification module 118B is depicted. Identification module 118B may, using the predictive search terms, received by the receiving module 118A, identify a search subject within the predictive search terms. In other words, the search subject is the subject of a predictive search terms which propels the search results and the answer to the simple question of "what is the user searching for?" For example, in an embodiment, in the question "where do you keep your milk?" the word "milk" is the search subject because the word milk is the vital part of this query and what the user is asking for. By changing the word "milk" to "cups" the response to this question will inevitably yield a different answer.

In one embodiment, identification module 118B may identify the search subject upon information received from the search engine server. The search engine server may point towards search domains. Search domain is a possible search sites to use for searching using the search term. These search domains may indicate the search subject. Identification module 118B may receive the search domains from the search engine server. In various embodiments, "what is the email of ________" may result in a search in some rolodex or a yellow pages, "what books did ________ write" may result in a search in Wikipedia, or "what is the status of ticket to ________" may result in a query to a ticket-purchasing application or ticket providing sites. Therefore identification module 118B may use the search domains to identify the search subject by identifying the commonality of categories between the sites by analyzing the commonality of the indexes and categories of all the sites. For example, in one embodiment, when the search term of "what is the status of flight to Zurich" results in a query of many airport sites, identification module 118B may identify that the word "Zurich" is the search subject because all search domains have cities and destinations in common. Because the word "Zurich" is a city/destination, it is consistent with the commonality among the search domains; based on this information, identification module 118B may identify "Zurich" as the search subject. In one embodiment the search domains sites are included within the predictive search terms as metadata and identification module 118B analyzes said metadata.

In another embodiment, the search engine can progressively retrieve search results and analyze the results to dynamically identify the search subject. Identification module 118B may, in order to process the natural language, decompose the received predictive search terms into tokens and may use the tokens to determine the search subject. A token is a short piece of text or a fragment of a sentence usually comprising of words. A word is a smallest element that may be uttered in isolation with semantic or pragmatic content (i.e. literal or practical meaning). Non-limiting examples of a token include nouns, adjectives, and pronouns. Identification module 118B may analyze each token for various semantic properties. Identification module 118B may analyze the tokens and determine the search subject based on the common semantic properties of each token, sentence structure of the predictive search terms, and common properties of the tokens among all predictive search terms. For example, in one embodiment, the predictive search terms may comprise the following:

What to expect during month 1 of pregnancy;
What to expect during month 2 of pregnancy;
What to expect during month 9 of pregnancy;

After decomposing the terms into token and analyzing these tokens, identification module 118B may determine that the month number is the common token among all predictive search terms and therefore the search subject (i.e. a search subject search sentence of what to expect during month ________ of pregnancy).

In the present embodiment, identification module 118B analyzes the predictive search terms. The predictive search terms are as follows:

"What are the books written by Hemingway";
"What are the books written by Steinbeck";
"What are the books written by Shakespeare";
"What are the albums of the Beatles"; and
"What are the albums of Justin Bieber".

Identification module 118B determines that the name of the author or the artist from a book or an album is the search subject because that is the common token property among all the predictive search terms.

At 208-214, operation of the interface module 118C is depicted. At 208, interface module may display a user interface which displays the predictive search sentence and displays the search subject differently compared to other terms among the predictive search terms. In an embodiment, interface module 118C may display the predictive search terms and insert a blank space instead of the search subject. In other embodiments, the relative position of the search subject (in relation to the other words of the predictive search term) is highlighted as illustrated by highlight 306 (alternatively, blank space 306) in the user interface 304.

In the present embodiment, the interface module 118C displays the predictive search terms and displays the search subject differently by displaying a blank space as illustrated in FIG. 3. The user interface 302 is displayed, in this embodiment, with multiple blank spaces (such as blank space 308) in order to indicate the search subjects. It should also be noted that in this embodiment, interface module 118C also provides three possible sentences (i.e. sentences 310, 312, and 314) as options for the user to pick.

At 210, interface module 118C may present the user with an option to modify the predictive search sentence (which comprises the predictive search terms) by modifying the search subject. The option to modify may be presented to the user by providing a blank space to the user to input the search subject by typing the word or any other electronic method such as speaking into a microphone. In other embodiments, interface module 118C may provide a list of search subjects for the user to pick.

In the present embodiment interface module 118C provides blank space 306 for the user to input the search subject. In the present embodiment, the user inputs the word "Hemingway" using a keyboard.

At 212, interface module 118C may receive the user's modification of the search subject. In this embodiment, the word Hemingway is received by the interface module 118C.

At 214, interface module 118C may display the sentence to be searched. This sentence comprises the original search terms (initially input by the user), the predictive search term (provided by the search engine), and the modified search subject (provided by the user). Interface module 118C may also communicate the sentence to be searched to a search engine.

In this embodiment the full sentence to be searched (i.e. sentence 304) is displayed by the interface module 118C. The full sentence, in this embodiment, is "what are the books written by Hemingway". This sentence comprises the "what are" (initially typed in by the user), "the books written by" (provided as the predictive search terms by the search engine), and "Hemingway" (provided by the user as the modified search subject).

It must be appreciated that, even though the present embodiment depicts the operation of the Predictive Term Modification Program 108 as comprising only one search subject, other embodiments may comprise multiple search subjects.

Figure 4:
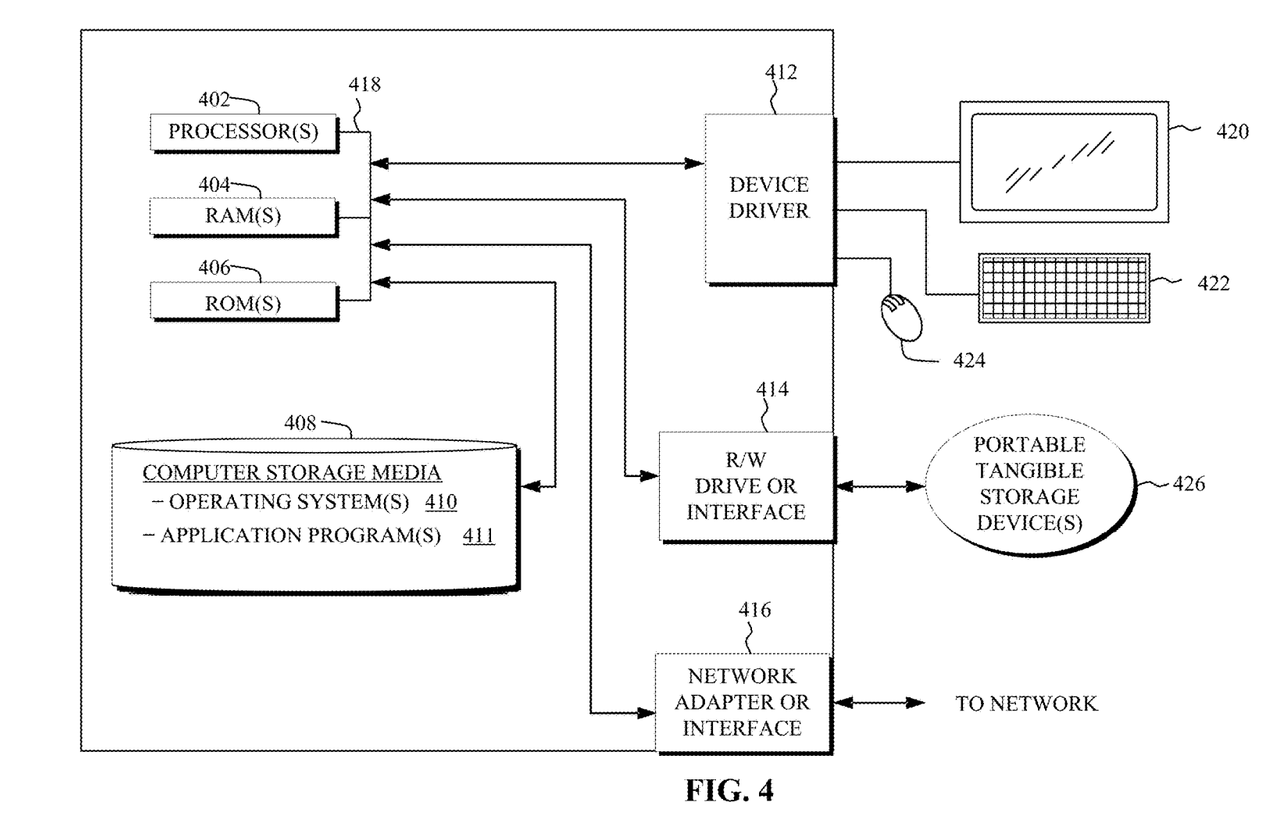
FIG. 4 is a block diagram of internal and external components of computers and servers depicted in FIGS. 1A-B according an embodiment of the present disclosure.

FIG. 4 depicts a block diagram of components a computer system, for example server 112 and computer 102, of distributed computing environment 100 of FIG. 1, in accordance with an embodiment of the present invention.

Server 112 and computer 102 may include one or more processors 402, one or more computer-readable RAMs 404, one or more computer-readable ROMs 406, one or more computer readable storage media 408, device drivers 412, R/W drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411, are stored on one or more of the computer storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Server 112 and computer 102 may also include an R/W drive or interface 414 to read from and write to one or more portable computer readable storage media 426. Application programs 411 on server 112 and computer 102 may be stored on one or more of the portable computer readable storage media 426, read via the respective R/W drive or interface 414 and loaded into the respective computer readable storage media 408.

Server 112 may also include a network adapter or interface 416, such as a TCP/IP adapter card or wireless communication adapter (such as a 4G wireless communication adapter using OFDMA technology). Application programs 411 on server 112 and may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

Server 112 and computer 102 may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may comprise hardware and software (stored on computer readable storage media 408 and/or ROM 406).

Based on the foregoing, a computer system, method, and computer program product have been disclosed. However, numerous modifications and substitutions can be made without deviating from the scope of the present invention. Therefore, the present invention has been disclosed by way of example and not limitation.

Figure 5:
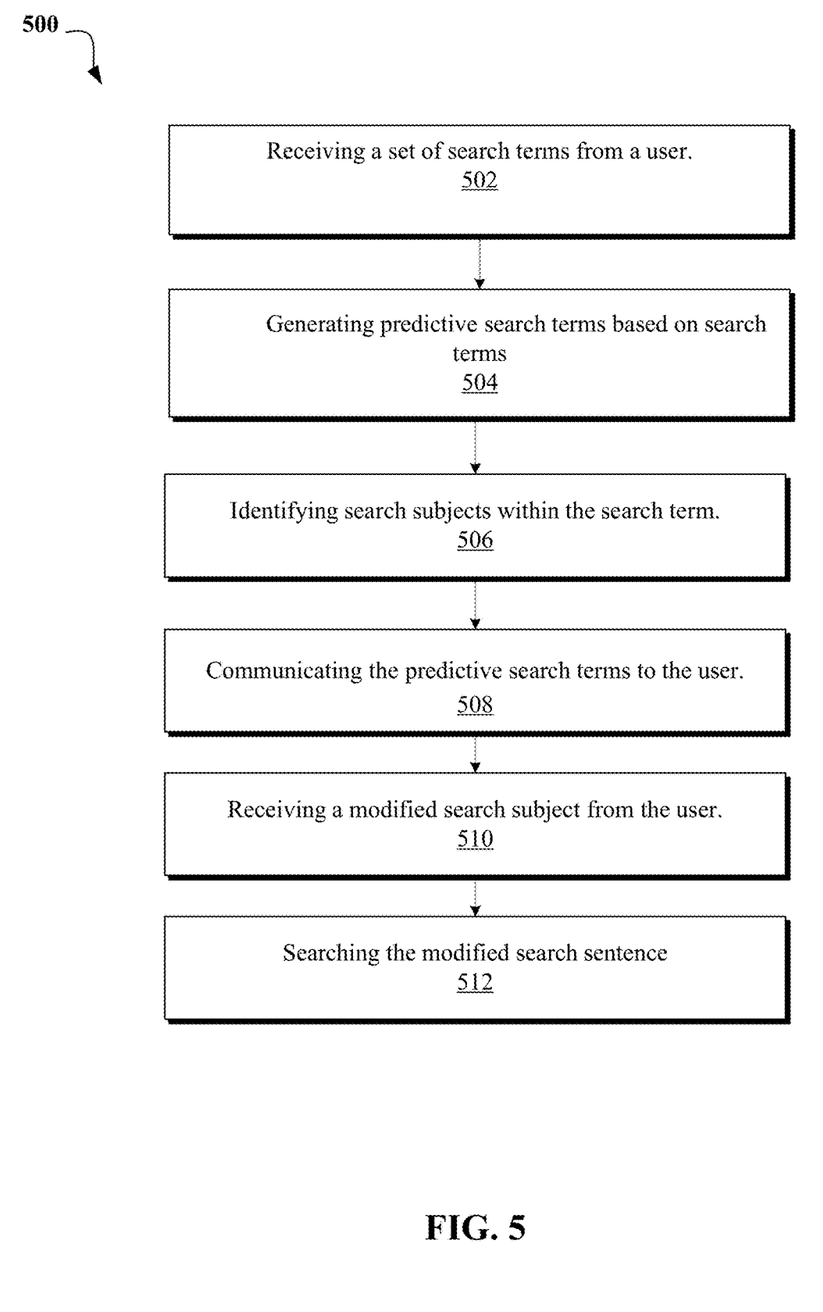
FIG. 5 is a flowchart depicting operational steps of a method for a Predictive Term Modification Program, in accordance with an embodiment of the present disclosure.

FIG. 5 is flowchart, which depicts the operational steps of a method 500 for a Predictive Term Modification Program 108, in accordance with an embodiment of the present disclosure. In reference to FIGS. 1A, 1B, 2 and 3, steps of the method 500 may be implemented using one or more modules of a computer program, for example, the Predictive Term Modification Program 108, and executed by a processor of a computer such as the computer 102.

At 502, the receiving module 118A may receive a set of words from a user or an electronic input source for use in a search, using an online search engine. Receiving module 118A may receive the word(s) from a user or a computer implemented system. Non-limiting examples of an input source may be spoken words, typed words, or inputting a corpus electronically from a computer implemented source such as an electronic device (e.g. cell phones, tablets, or other electronic devices with speech recognition programs). Receiving module 118A may also communicate the words received to a search engine. Furthermore, receiving module 118A may receive a set of predictive search terms from the search engine.

At 504, identification module 118B may generate predictive search terms. In one embodiment, identification module 118B may generate one or more predictive search terms based on the received search terms based on statistical data collected based on previous online searches.

At 506, identification module 118B may, using the predictive search terms, may identify a search subject within the predictive search terms. In one embodiment, identification module 118B may identify the search subject by identifying search domains of the associated predictive search terms. A search domain may refer to a domain, category of search, or database, that may be typically used to search for the predictive search terms. These search domains may indicate the search subject. Identification module 118B may identify the search domains. In various embodiments, "what is the email of __________" may result in a search in some rolodex or a yellow pages, "what books did __________ write" may result in a search in Wikipedia, or "what is the status of ticket to __________" may result in a query to a ticket-purchasing application or ticket providing sites. Therefore identification module 118B may use the search domains to identify the search subject by identifying the commonality of categories between the sites by analyzing the commonality of the indexes and categories of all the sites. For example, in one embodiment, when the search term of "what is the status of flight to Zurich" results in a query of many air travel sites, identification module 118B may identify that the word "Zurich" is the search subject because all search domains have cities and destinations in common. Because the word "Zurich" is a city/destination, it is consistent with the commonality among the search domains; based on this information, identification module 118B may identify "Zurich" as the search subject. In one embodiment the search domains sites are included within the predictive search terms as metadata and identification module 118B analyzes said metadata.

In another embodiment, the search engine can progressively retrieve search results and analyze the results to dynamically identify the search subject. Identification module 118B may, decompose the received predictive search terms into tokens and may use the tokens to determine the search subject. A token may be a short piece of text or a fragment of a sentence usually comprising of words. A word may be defined, in one embodiment, as a smallest element that may be uttered in isolation with semantic or pragmatic content (i.e. literal or practical meaning). Non-limiting examples of a token include nouns, adjectives, and pronouns. Identification module 118B may analyze each token for various semantic properties. Identification module 118B may analyze the tokens and determine the search subject based on the common semantic properties of each token, sentence structure of the predictive search terms, and common properties of the tokens among all predictive search terms. For example, in one embodiment, the predictive search terms may comprise the following:

What to expect during month 1 of pregnancy;
What to expect during month 2 of pregnancy;
What to expect during month 9 of pregnancy;

After decomposing the terms into token and analyzing these tokens, identification module 118B may determine that the month number is the common token among all predictive search terms and therefore the search subject (i.e. a search subject search sentence of what to expect during month ____ of pregnancy).

At 508, interface module 118C may generate instructions to communicate the predictive search to the user. The presentation of the predictive search subject to the user is explained above at paragraph 0042.

At 510, interface module 118C may receive a modified search subject from the user. The receiving of the modified search subjects is explained in more detail, above.

At 512, interface module 118C may conduct an online search based on a modified search sentence comprising the original search terms (initially input by the user), the predictive search term (provided by the search engine), and the modified search subject (provided by the user). Interface module 118C may also generate instructions to display the search results to the user.

The invention claimed is:

1. A computer implemented method for modification of search subjects in a set of predictive search terms, the method comprising:
   receiving a set of search terms from a user;
   communicating the search terms to a search engine;
   receiving one or more sets of predictive search terms from the search engine based on the set of search terms;
   identifying one more search subjects within the one or more sets of predictive search terms, wherein identifying the one or more search subjects comprises analyzing the received set of search terms and the one or more sets of predictive search terms for various semantic properties;
   combining the set of search terms from the user, the one or more sets of predictive search terms, and the identified one or more search subjects to form one or more combined search sentences;
   displaying the one or more combined search sentences, wherein the identified one or more search subjects is displayed as a blank space within the one or more combined search sentences;
   presenting the user with an option to modify the one or more search subjects; receiving a modified search subject from the user; and
   displaying a modified search sentence comprising the set of search terms, and one or more of the predictive search terms and the modified search subject.

2. The method of claim 1, further comprising:
   communicating the modified search sentence to a search engine.

3. The method of claim 1, wherein the option to modify the one or more search subjects comprises a list of predictive search subjects.

4. The method of claim 1, further comprising:
   receiving a text input from the user; and
   determining the modified search sentence based on the text input.

5. The method of claim 4, further comprising:
   communicating the modified search sentence to a search engine,
   wherein the text input is received from the user prior to communicating the modified search sentence to the search engine.

6. The method of claim 1, further comprising: setting an input cursor at a beginning location of the blank space, wherein the blank space comprises a text input field.

7. The method of claim 1, wherein receiving the modified search subject from the user comprises:
   generating a prompt for the user to speak;
   receiving an audio input from the user;
   converting the audio input into digital text, wherein the converted audio input corresponds to the modified search subject.

8. A computer system for modification of search subjects in a set of predictive search terms, the computer system comprising:
   one or more computer processors;
   one or more computer-readable storage media;
   program instructions stored on the computer-readable storage media for execution by at least one of the one or more processors, the program instructions comprising:
      instructions to receive a set of search terms from a user;
      instructions to communicate the search terms to a search engine;
      instructions to receive one or more sets of predictive search terms from the search engine based on the set of search terms;
      instructions to identify one or more search subjects within the one or more sets of predictive search terms, wherein the instructions to identify the one or more search subjects comprises analyzing the received set of search terms and the one or more sets of predictive search terms for various semantic properties;
      instructions to combine the set of search terms from the user, the one or more sets of predictive search terms, and the identified one or more search subjects to form one or more combined search sentences;
      instructions to display the combined search sentences, wherein the identified one or more search subjects is displayed as a blank space within the one or more combined search sentences;
      instructions to present the user with an option to modify the one or more search subjects;
      instructions to receive a modified search subject from the user; and
      instructions to display a modified search sentence comprising the set of search terms, and one or more of the predictive search terms and the modified search subject.

9. The system of claim 8, further comprising:
   communicating the modified search sentence to a search engine.

10. The system of claim 8, wherein the option to modify the one or more search subjects comprises a list of predictive search subjects.

11. The system of claim 8, further comprising:
    receiving a text input from the user; and
    determining the modified search subject based on the text input.

12. The system of claim 8, wherein receiving the modified search subject from the user comprises:
    generating a prompt for the user to speak;
    receiving an audio input from the user;
    converting the audio input into digital text, wherein the converted audio input corresponds to the modified search subject.

13. A computer program product for modification of search subjects in a set of predictive search terms, comprising a computer-readable storage medium having program code embodied therewith, the program code executable by a processor of a computer to perform a method comprising:

receiving a set of search terms from a user;
communicating the search terms to a search engine;
receiving one or more sets of predictive search terms from the search engine based on the set of search terms;
identifying one or more search subjects within the one or more sets of predictive search terms, wherein identifying the one or more search subjects comprises analyzing the received set of search terms and the one or more sets of predictive search terms for various semantic properties;
combining the set of search terms from the user, the one or more sets of predictive search terms, and the identified one or more search subjects to form one or more combined search sentences;
displaying the one or more combined search sentences, wherein the identified one or more search subjects is displayed as a blank space within the one or more combined search sentences;
presenting the user with an option to modify the one or more search subjects; receiving a modified search subject from the user; and
displaying a modified search sentence comprising the set of search terms, and one or more of the predictive search terms and the modified search subject.

14. The computer program product of claim 13, further comprising:
communicating the modified search sentence to a search engine.

15. The computer program product of claim 13, wherein the option to modify the one or more search subjects comprises a list of predictive search subjects.

16. The computer program product of claim 13, further comprising:
receiving a text input from the user; and
determining the modified search sentence based on the text input.

17. The computer program product of claim 13, wherein receiving the modified search subject from the user comprises:
generating a prompt for the user to speak;
receiving an audio input from the user;
converting the audio input into digital text, wherein the converted audio input corresponds to the modified search subject.

* * * * *